US008683950B2

(12) United States Patent
Hung

(10) Patent No.: US 8,683,950 B2
(45) Date of Patent: Apr. 1, 2014

(54) SYNCHRONOUS POULTRY FEEDING SYSTEM

(76) Inventor: Shu-Hui Hung, Taichung (TW)

( * ) Notice: Subject to any disclaimer, the term of this patent is extended or adjusted under 35 U.S.C. 154(b) by 0 days.

(21) Appl. No.: 13/611,878

(22) Filed: Sep. 12, 2012

(65) Prior Publication Data

US 2013/0269619 A1 Oct. 17, 2013

(30) Foreign Application Priority Data

Apr. 11, 2012 (TW) .............................. 101112890 A

(51) Int. Cl.
*A01K 39/01* (2006.01)
(52) U.S. Cl.
USPC ........................................ 119/61.3; 119/52.3
(58) Field of Classification Search
USPC ............ 119/52.4, 51.01, 53, 63, 61.3, 58, 59, 119/60, 52.1, 52.3, 51.11, 57.1, 51.12, 57.2, 119/476, 478
See application file for complete search history.

(56) References Cited

U.S. PATENT DOCUMENTS

| | | | | | |
|---|---|---|---|---|---|
| 1,847,351 | A | * | 3/1932 | McCaughey | 119/61.3 |
| 1,881,023 | A | * | 10/1932 | Hoeft | 119/61.3 |
| 3,333,573 | A | * | 8/1967 | Wotring | 119/57.2 |
| 3,523,519 | A | * | 8/1970 | Hostetler | 119/457 |
| 3,916,837 | A | * | 11/1975 | Murto | 119/476 |
| 4,059,071 | A | * | 11/1977 | Van Huis et al. | 119/457 |
| 4,147,132 | A | * | 4/1979 | Gilst | 119/53 |
| 4,167,154 | A | * | 9/1979 | Hill | 119/53 |
| 4,315,484 | A | * | 2/1982 | Kingery | 119/53 |
| 4,375,791 | A | * | 3/1983 | Peppler | 119/57.92 |
| 4,516,531 | A | * | 5/1985 | Snetsinger et al. | 119/476 |
| 5,605,113 | A | * | 2/1997 | Krehl | 119/57.92 |
| 5,967,083 | A | * | 10/1999 | Kleinsasser | 119/53 |
| 7,753,001 | B2 | | 7/2010 | Hung | |
| 2005/0005866 | A1 | * | 1/2005 | Bondarenko et al. | 119/53 |
| 2006/0000417 | A1 | * | 1/2006 | Loewe | 119/53 |

* cited by examiner

*Primary Examiner* — T. Nguyen
(74) *Attorney, Agent, or Firm* — Jackson IPG PLLC

(57) ABSTRACT

The present invention provides a synchronous poultry feeding system, wherein a barrier member is configured through the feed conveying trough. The conveying trough comprises a trough and a fence configured above the trough. The fence is configured with a plurality of feeding openings. The outer edge of the barrier member is close to the inner wall of the trough and the fence. The barrier member can be controlled by the control device to be lifted or lowered inside the conveying trough. In this way, when the barrier member is not lifted, it can block the feed inside the trough, so that the poultry cannot stretch into the trough to eat, while when the barrier member is lifted to an appropriate height, the poultry can stretch from their respective feeding openings into the trough to eat.

6 Claims, 4 Drawing Sheets

SYNCHRONOUS POULTRY FEEDING SYSTEM

BACKGROUND OF INVENTION

1. Field of the Invention

The present invention relates generally to a poultry feeding device, and more particularly to a synchronous poultry feeding system.

2. Description of Related Art

For the purpose of mass feeding, a conventional feeding system used in poultry farms usually consists of multiple feeders and other structural members like the supply pipe connecting each of the feeders. With such a system, the feed can be conveyed through the supply pipe to each feeder and the poultry can eat from their respective feeder.

Although the above feeding system can fulfill the purpose of mass feeding, in practice, during the feeding, the poultry will usually crowd around and strive to eat from the feeder and some of the poultry may not get the chance to eat or have little to eat. Obviously, the poultry cannot have equal feed intake and the breeding quality will not be consistent.

For this reason, the inventor developed a patent named "Barrier for Poultry Trough" (U.S. Pat. No. 7,753,001), which mainly provides a barrier for poultry trough with configuration of a barrier member above the long conveying trough to be lifted or lowered, so that, when filling feed into the conveying trough, the barrier member can block the conveying trough, and the heads of the poultry cannot stretch into the conveying trough, and when the conveying trough is filled with feed, the barrier member can be lifted so that the poultry on both sides of the conveying trough can be fed synchronously. In this way, the poultry can have equal feed-intake and the breeding quality will be consistent.

However, during the feeding, as the poultry will rush and crowd to the sides of conveying trough, and conditions of collision against or hurt by the barrier member are unavoidable, the above invention still has an obvious room for improvement.

SUMMARY OF THE INVENTION

The main purpose of the present invention is to provide a synchronous poultry feeding system, which can effectively guarantee synchronous feeding and improve the efficiency and quality of feeding. Meanwhile, it provides a simple and effective structure to avoid hurt of the poultry. It features both good efficiency and high practical value.

Hence, to fulfill the above purpose, the present invention provides a synchronous poultry feeding system, which comprises a conveying trough, including a trough with an upward opening, a fence configured above the trough, and a plurality of feeding openings configured on the fence and connected to the trough; a barrier member, configured through the conveying trough, with its outer edge adjacent to the inner wall of the trough and the fence; a control device, connected to the barrier member, so that the barrier member can be lifted or lowered inside the conveying trough.

DETAILED DESCRIPTION OF THE INVENTION

Figure 1:
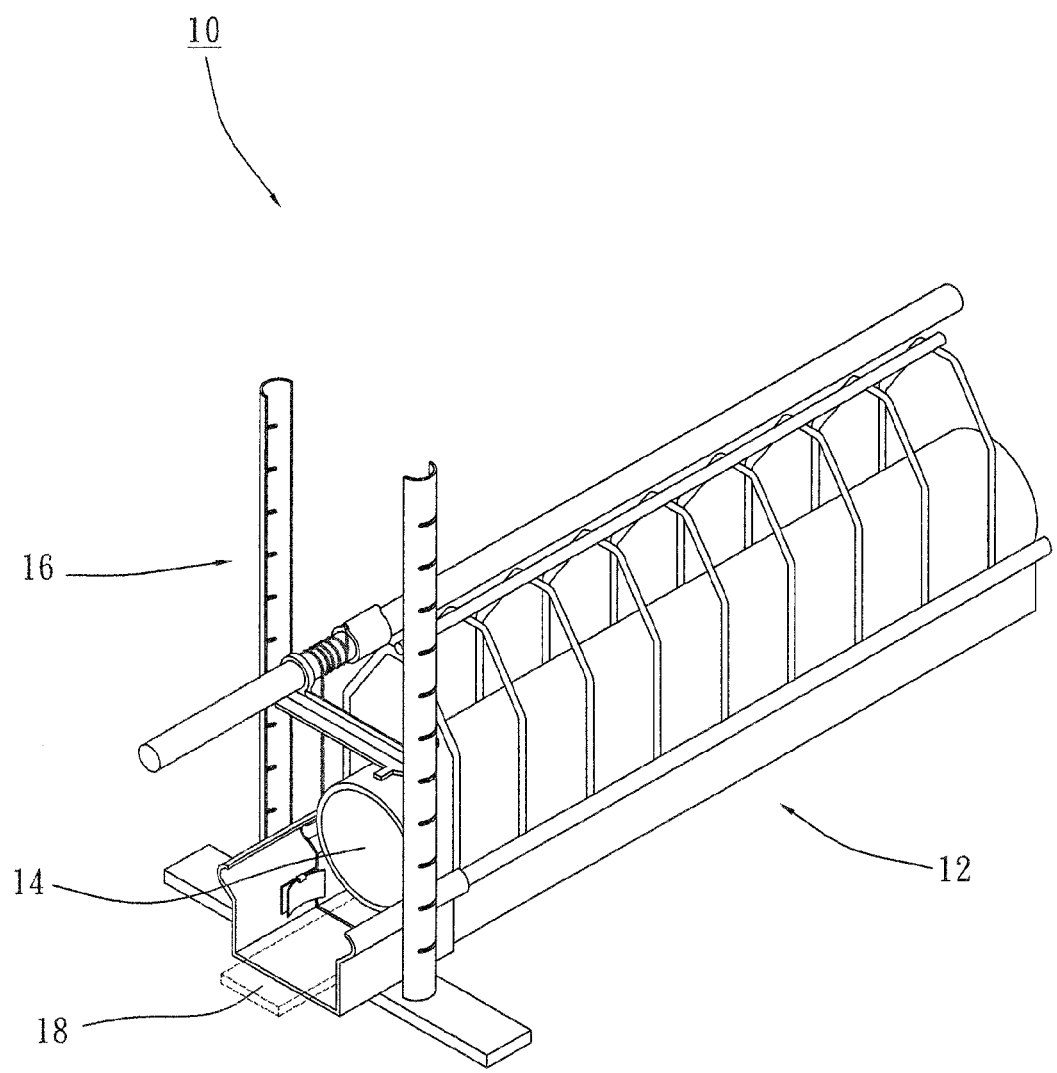
FIG. 1 is a perspective view of the preferred embodiment of the present invention.
Figure 2:
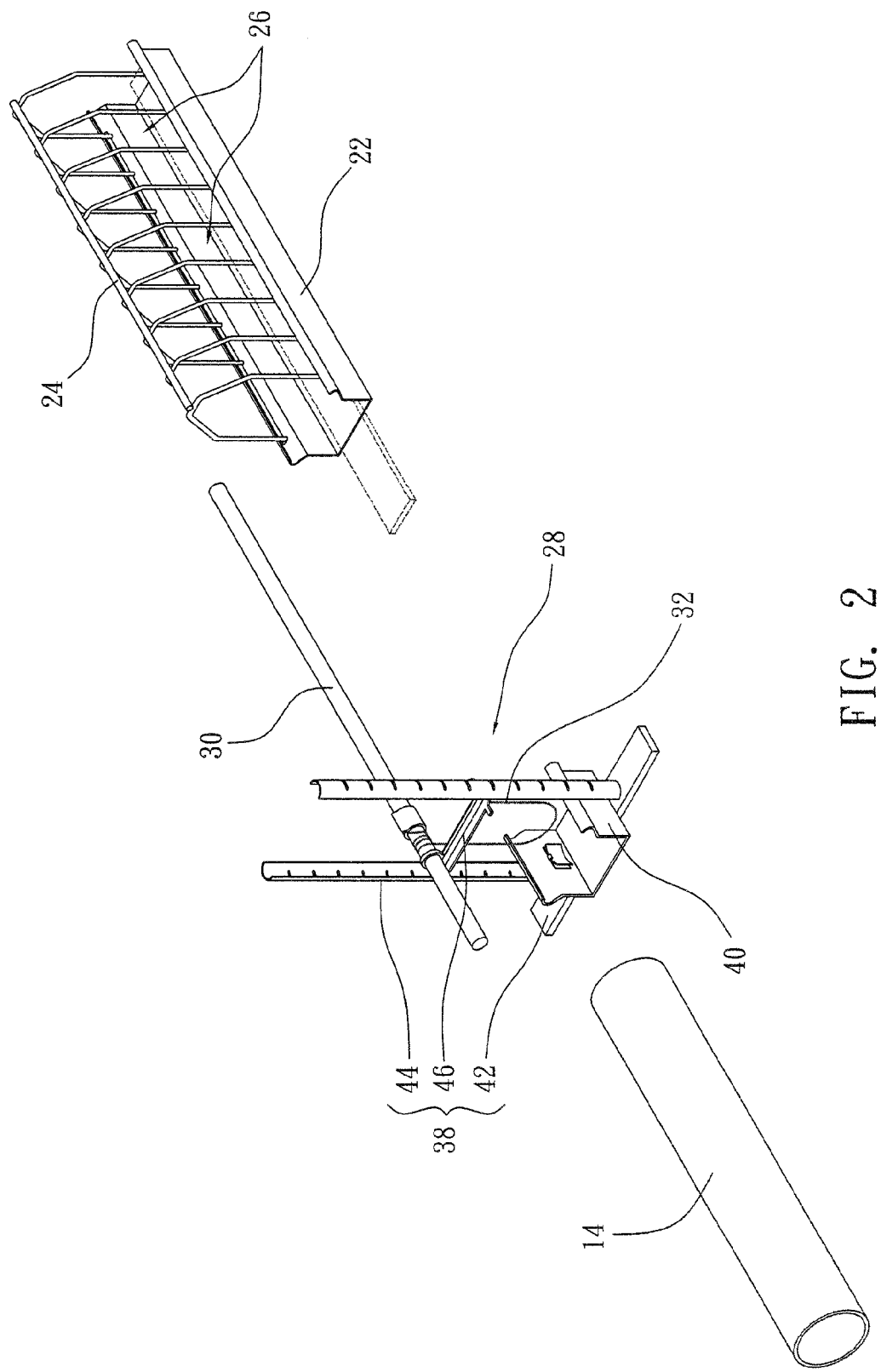
FIG. 2 is a part exploded perspective view of the preferred embodiment of the present invention.
Figure 3:
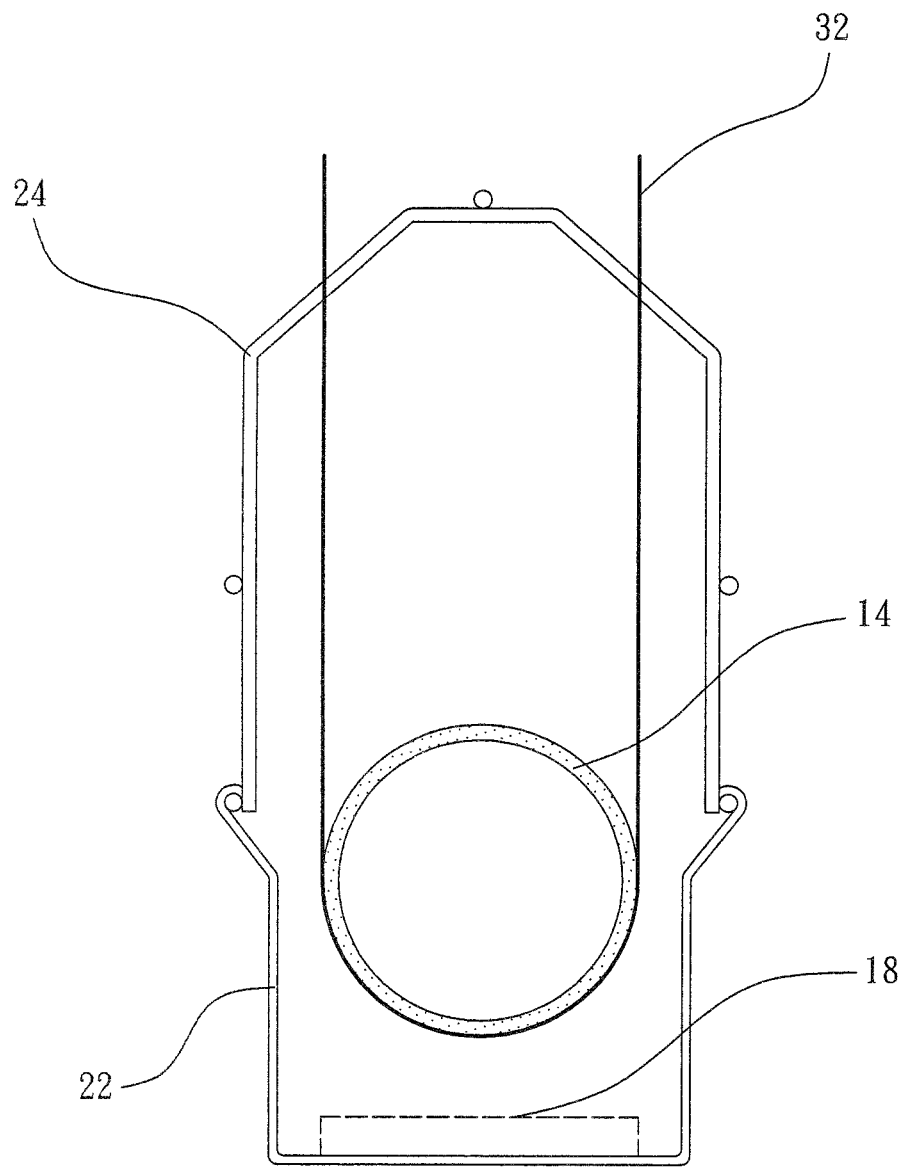
FIG. 3 is a top rear view of the conveying troughs, barrier member and moving piece of the preferred embodiment of the first present invention.

Below is a detailed description of the present invention based on an example of a preferred embodiment and the accompanied drawings:

Firstly, referring to FIGS. 1-3, as a preferred embodiment of the present invention, the synchronous poultry feeding system 10 comprises a conveying trough 12, a barrier member 14 and a control device 16.

The conveying trough 12 has a chute 22 with an upward opening, a fence 24, configured above the chute 22, roughly in the shape of a grid to form a plurality of feeding openings 26 connecting to the chute 22.

The barrier member 14 is a tube with a round section and an appropriate arc on its surface, configured through the conveying trough 12, with its outer diameter slightly smaller than the chute 22 and the width of the inner wall of the fence 24, and close to the chute 22 and the inner wall of the fence 24.

The control device 16 comprises a frame body 28, a driving piece 30 and a moving piece 32. The frame body 28 has a frame 38 and a connecting piece 40 configured on the bottom side of the frame 38. The frame 38 is made up of a base 42, two upright tubes 44 and a supporting bar 46. The connecting piece 40 has a section similar to but slightly wider than the chute 22, and is configured on the base 42 and between the two upright tubes 44, to allow plugging of the chutes 22 of two conveying troughs 12 and to extend the conveying troughs 12. The driving piece 30 is configured on the supporting bar 46 in a rotary state, and the moving piece 32 is a soft linear material, with one end connecting the supporting bar 46, and the other end extending to the bottom of the barrier member 14 and connecting to the driving piece 30, so that when the driving piece 30 rotates, it will wind up or release the moving piece 32. In this way, the barrier member 14 can be lifted or lowered inside the conveying trough 12.

In addition, the synchronous poultry feeding system 10 further comprises a movable conveying belt 18, extending on the bottom of the chute 22 in a movable state and below the barrier member 14, to convey feed into the chute 22.

Figure 4:
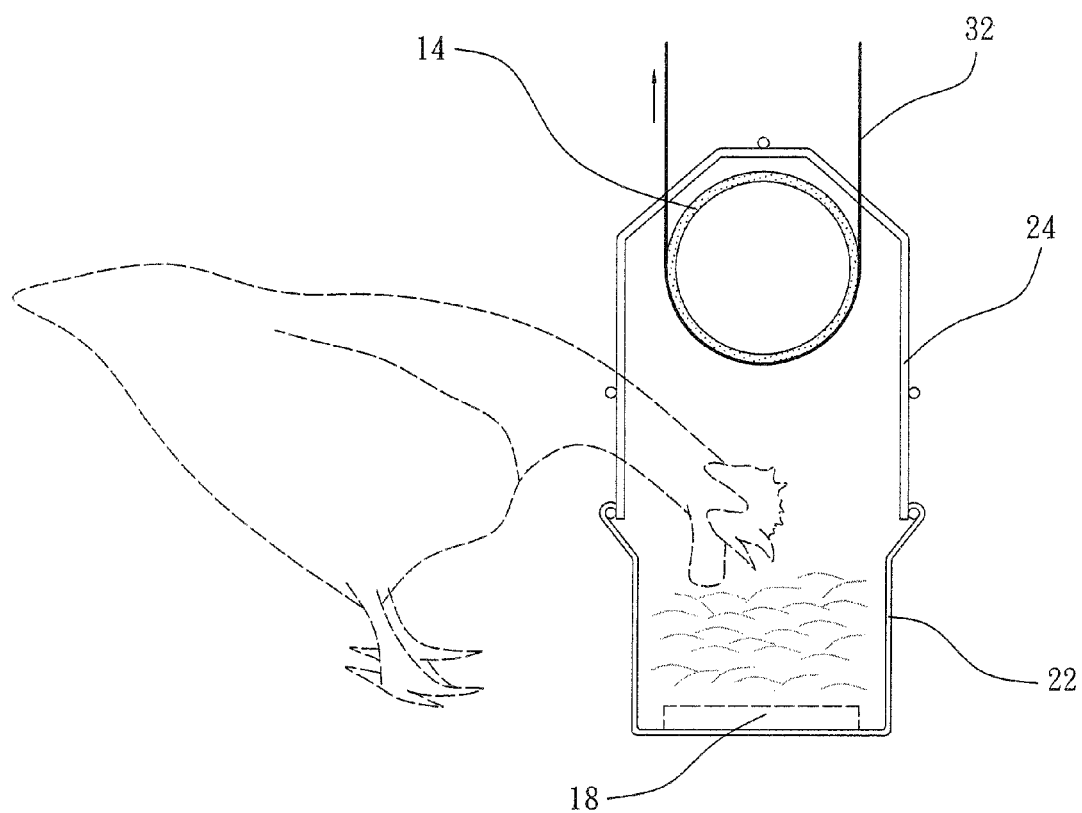
FIG. 4 is a using state view of the preferred embodiment of the present invention.

Based on the above, the synchronous poultry feeding system 10 of the present invention has the following operating method, characteristics and efficacies:

When feeding poultry (chickens, ducks, geese etc), the poultry breeding operator will firstly put feed through the conveying belt 18 into the conveying trough 12. When the whole conveying trough 12 is filled with feed, the operator can rotate the driving piece 30 (manually or mechanically) to reduce the length of the moving piece 32. In this way, barrier member 14 can be driven to rise. When the barrier member 14 rises to an appropriate height (the heads of the poultry can stretch from their respective feeding openings 26 into the chute 22 without being limited by the barrier member 14, the operator can stop rotating the driving piece 30, and the poultry on both sides of the conveying trough 12 can synchronously stretch from the feeding openings 26 of the fence 24 into the chute 22 to eat, as shown in FIG. 4. After finishing the feeding, the operator just needs to rotate the driving piece 30 reversely to lower the barrier member 14, so that the barrier member 14 can go into the chute 22, and the heads of the poultry will be blocked by the barrier member 14 and cannot stretch into the chute 22 to eat. In this way, feeding of the poultry can be started and stopped synchronously.

The synchronous poultry feeding system 10 of the present invention mainly features the combination of the conveying trough 12 and the barrier member 14. By driving the barrier member 14 to rise and fall, the poultry on both sides of the conveying trough 12 can be fed or prohibited synchronously, so that all the poultry will get the chance to eat and their feed intakes are equal. In this way, the efficiency and consistent quality of feeding can be enhanced. The present invention has successfully solved the problem that the poultry cannot be fed synchronously using prior-art feeders used in current poultry breeding farms, and is suitable for mass poultry breeding.

Particularly, the barrier member 14 of the synchronous poultry feeding system 10 to block the poultry has a simple and effective structure, and its surface design will not hit or cut the poultry anxious to eat. Comparing to the previous patented "Barrier for Poultry Trough" by the inventor, which may occasionally cause hurt of the poultry, the present invention has an obvious advancement in efficacy and has good practical value.

To conclude, through configuration of a barrier member inside the conveying trough to be lifted or lowered, the synchronous poultry feeding system provided by the present invention can effectively guarantee synchronous feeding and improve the efficiency and quality of feeding. And comparing to the previous patented "Barrier for Poultry Trough" by the inventor, the present invention has a simpler but more effective structure, and can avoid hurt of the poultry. There is an obvious advancement in efficacy and practical value.

What is claimed is:

1. A synchronous poultry feeding system, comprising:
   a conveying trough, including a trough with an upward opening to hold feed, a fence configured above the trough, with a plurality of feeding openings configured on it and connecting to the trough;
   a barrier member, configured through the conveying trough, with its outer edge adjacent to the inner wall of the trough and the fence; and
   a control device, connecting to the barrier member, to control the barrier member to be lifted or lowered inside the conveying trough, and further control the heads of the poultry to able to or unable to stretch from their respective feeding openings into the trough to eat;
   wherein the control device comprises a driving piece, and a moving piece connecting the driving piece to the barrier member, so that it can be driven by the driving piece to lift or lower the barrier member inside the conveying trough;
   wherein the control device further comprises a frame body, with the driving piece configured on the frame body in a rotary state, so that it can rotate to pull one end of the moving piece; and
   wherein the frame body comprises a frame, with the driving piece and the moving piece configured on the frame, and a connecting piece configured on the bottom of the frame, for chutes of two conveying troughs to plug in.

2. The system defined in claim 1, which further comprises a conveying belt, extending on the bottom of the trough in a movable state to convey feed into the trough; the barrier member is configured between the fence and the conveying belt.

3. The system defined in claim 1, wherein the surface of the barrier member has an appropriate arc.

4. The system defined in claim 3, wherein the section of the barrier member is round.

5. The system defined in claim 1, wherein the connecting piece has an appropriate softness, with one end connecting to the frame body, and the other extending to the bottom of the barrier member and connecting to the driving piece, so that the driving piece can rotate to wind up or release the moving piece.

6. The system defined in claim 5, wherein the moving piece is a soft linear material.

* * * * *